United States Patent [19]

Shipman et al.

[11] Patent Number: 4,781,417
[45] Date of Patent: Nov. 1, 1988

[54] UPHOLSTERED SEAT CUSHION SUPPORT

[75] Inventors: Roger A. Shipman, West Bloomfield; Richard M. Kostin, Dearborn; William J. Brezina, Dearborn Heights, all of Mich.

[73] Assignee: Ford Motor Company, Dearborn, Mich.

[21] Appl. No.: 130,043

[22] Filed: Dec. 7, 1987

[51] Int. Cl.⁴ .............................................. A47C 7/02
[52] U.S. Cl. .................... 297/458; 297/452; 297/DIG. 2
[58] Field of Search .......... 297/458, 459, 452, DIG. 2

[56] References Cited

U.S. PATENT DOCUMENTS

| | | |
|---|---|---|
| 628,704 | 7/1899 | Gates . |
| 2,804,129 | 8/1957 | Propst . |
| 2,853,122 | 9/1958 | Shapiro . |
| 2,970,638 | 2/1961 | Halter . |
| 3,177,036 | 4/1965 | Halter . |
| 3,178,221 | 4/1965 | Schwarz . |
| 3,399,883 | 9/1968 | McKey . |
| 3,463,547 | 8/1969 | Brennan et al. ...................... 297/459 |
| 3,583,759 | 6/1971 | Kramer . |
| 3,583,762 | 6/1971 | Strien . |
| 3,635,524 | 1/1972 | Faust . |
| 3,740,096 | 6/1973 | Bridger ............................... 297/459 |
| 3,749,422 | 7/1973 | Berg et al. . |
| 3,758,159 | 9/1973 | Morris . |
| 3,904,243 | 9/1975 | Kostelec et al. ............. 297/DIG. 2 |
| 4,036,526 | 7/1977 | Baechle et al. ...................... 297/452 |
| 4,132,228 | 1/1979 | Green . |
| 4,368,917 | 1/1983 | Urai . |
| 4,418,958 | 12/1983 | Watkin . |
| 4,502,731 | 3/1985 | Snider .............................. 297/459 X |
| 4,536,030 | 8/1985 | Sakurada et al. . |
| 4,561,695 | 12/1985 | MacCready . |
| 4,568,124 | 2/1986 | Kanai . |
| 4,602,819 | 7/1986 | Morel ................................... 297/460 |
| 4,607,887 | 8/1986 | Vail . |
| 4,647,109 | 3/1987 | Christophersen et al. ......... 297/457 |
| 4,660,887 | 4/1987 | Fleming et al. ...................... 297/455 |
| 4,671,570 | 6/1987 | Hockenberry .................. 297/459 X |

FOREIGN PATENT DOCUMENTS

| | | |
|---|---|---|
| 2518468 | 11/1968 | Fed. Rep. of Germany . |
| 1539731 | 8/1968 | France . |
| 1329414 | 9/1973 | United Kingdom . |
| 2084458 | 4/1982 | United Kingdom . |

OTHER PUBLICATIONS

Herman Miller Inc. Brochure–Equa Chair (pp. 1–4).

Primary Examiner—James T. McCall
Attorney, Agent, or Firm—Peter D. McDermott; Roger L. May

[57] ABSTRACT

A seat cushion support for an upholstered seat cushion comprises a one-piece, form-retaining, resilient seat pan, preferably of molded plastic, and a pair of mounting tangs, each unitary with the seat pan. The seat pan has a curvilinear upper surface, ishium accommodating means in a rearward portion of the seat pan, which is concavely curved downwardly, and a forward portion which curves downwardly to a forward edge. The mounting tangs are located inboard of and proximate lateral edges, each mounting tang extending downwardly from connection with the seat pan. An upholstered seat cushion assembly comprises such seat cushion support, a cushion, an upholstery covering, and mounting brackets to which the mounting tangs are attached.

15 Claims, 3 Drawing Sheets

UPHOLSTERED SEAT CUSHION SUPPORT

BACKGROUND OF THE INVENTION

This invention relates to a seat cushion support for an upholstered seat, and especially to a molded one-piece form-retaining resilient plastic support member for an upholstered motor vehicle seat.

A motor vehicle seat cushion assembly, that term here being used to refer to a seat bottom as distinguished from a seat back assembly, typically comprises a seat frame having a plurality of springs stretched on a metal frame. A cushion or pad is placed over the springs and an upholstery cover is applied, e.g. by stitching, over the entire structure. Typically, the springs are of the coiled or serpentine type, or both. It is well known to those skilled in the motor vehicle seating art that such seat assemblies, i.e., those having a conventional open seat frame with a plurality of conventional springs secured thereto, have numerous inherent disadvantages. One such inherent disadvantage is the high cost of conventional steel springs having suitable elastic characteristics. In addition, the assembly of the frame, including the numerous springs which must be attached to the frame, is a labor intensive and expensive operation. Also, a thick cushion or pad is required to adequately distribute and transfer the seat occupant's weight and to protect the seat occupant from discomfort due to contact with the springs or frame. In addition, upholstery may be torn or otherwise damaged during manufacture and use of such seats by springs which become detached at one end from the frame. Another significant disadvantage is the weight of such frame and spring assemblies. This is of particular concern in the manufacture of motor vehicles, where reduced weight contributes directly to improved fuel economy.

Various structures have been proposed, and occasionally used, as alternatives to conventional open seat frames having a plurality of conventional springs. Thus, for example, U.S. Pat. No. 4,502,731 to Snider discloses a one-piece seat frame comprising a thin-walled, hollow, molded body of plastic or other suitable, relatively rigid yet resilient material. The molded body of Snider has a pair of side walls, a rear wall, a front wall, an open bottom and a positively bowed top wall. A plurality of parallel curvilinear slots are Provided through the top wall to form a plurality of parallel curvilinear segments which act as cantilever-action spring elements. It is taught therein that in response to a typical load created by a seat occupant, the spring elements are deflected downward in a cantilever manner. Similar teaching is provided, for example, in U.S. Pat. No. 3,399,883 to McKey, wherein is disclosed a seat frame structure consisting essentially of a single sheet of resilient material which functions as a flexible or resilient support means for a seat assembly. Two rows of parallel tapered slots permit the mid-portion of a sheet to assume the contour of the load created by the seat occupant. A similar seat frame structure is disclosed in U.S. Pat. No. 2,804,129 to Propst, wherein a single seat of resilient material is provided with parallel untapered slots around its periphery. Each such slot terminates in a circular recess.

All such prior structures comprising formed resilient support assemblies, however, fail to adequately meet the unique and stringent requirements of motor vehicle seating structures. Most notably, for example, a suitable seat support structure for a motor vehicle must provide excellent vibration isolation for the seat occupant. In addition, it must have load/deflection characteristics suitable to comfortably accommodate the typical ingress and egress path to the side of such seating used by motor vehicle occupants. In addition, motor vehicle seating must provide a high degree of comfort for the seat occupant in view of the possibly long periods of seat occupation and transmission to the seat occupant of at least a measure of vibration due to road roughness. Another significant feature sought in motor vehicles seating is that the seat support characteristics should be tunable, that is, adjustable from one vehicle to another or from one vehicle line to another with little or no change in the design of the structure and also, preferably, adjustable by the seat occupant.

It is an object of the present invention to provide an upholstered seat cushion support, especially a one-piece seat cushion support for motor vehicle seating, which is easily tunable in its load bearing characteristics with little or no change of design. Other objects and advantages of the present invention will be understood from the following disclosure.

SUMMARY OF THE INVENTION

The present invention provides a seat cushion support for an upholstered seat, comprising:

a one-piece, form-retaining, resilient seat pan having a substantially curvilinear upper surface, substantially parallel lateral edges, a forward edge substantially perpendicular to the lateral edges, ishium accommodating means in a rearward portion of the seat pan, the rearward portion being concavely curved downwardly, and a forward portion which comprises a forwardmost region curving downwardly to the aforesaid forward edge; and a pair of mounting tangs, each unitary with the seat pan and located proximate and inboard of a corresponding one of the aforesaid lateral edges, each extending downwardly from connection with the seat pan.

According to a second aspect of the invention, an upholstered seat cushion assembly comprises the aforesaid seat cushion support, a pad or cushion against the upper surface of the seat pan and an upholstery cover encasing the seat pan and cushion, wherein each of the aforesaid mounting tangs is attached to a corresponding mounting bracket.

BRIEF DESCRIPTION OF THE DRAWINGS

The objects and advantages of the invention will be appreciated from the following description and accompanying drawings wherein.

DETAILED DESCRIPTION OF PREFERRED EMBODIMENT

Figure 1:
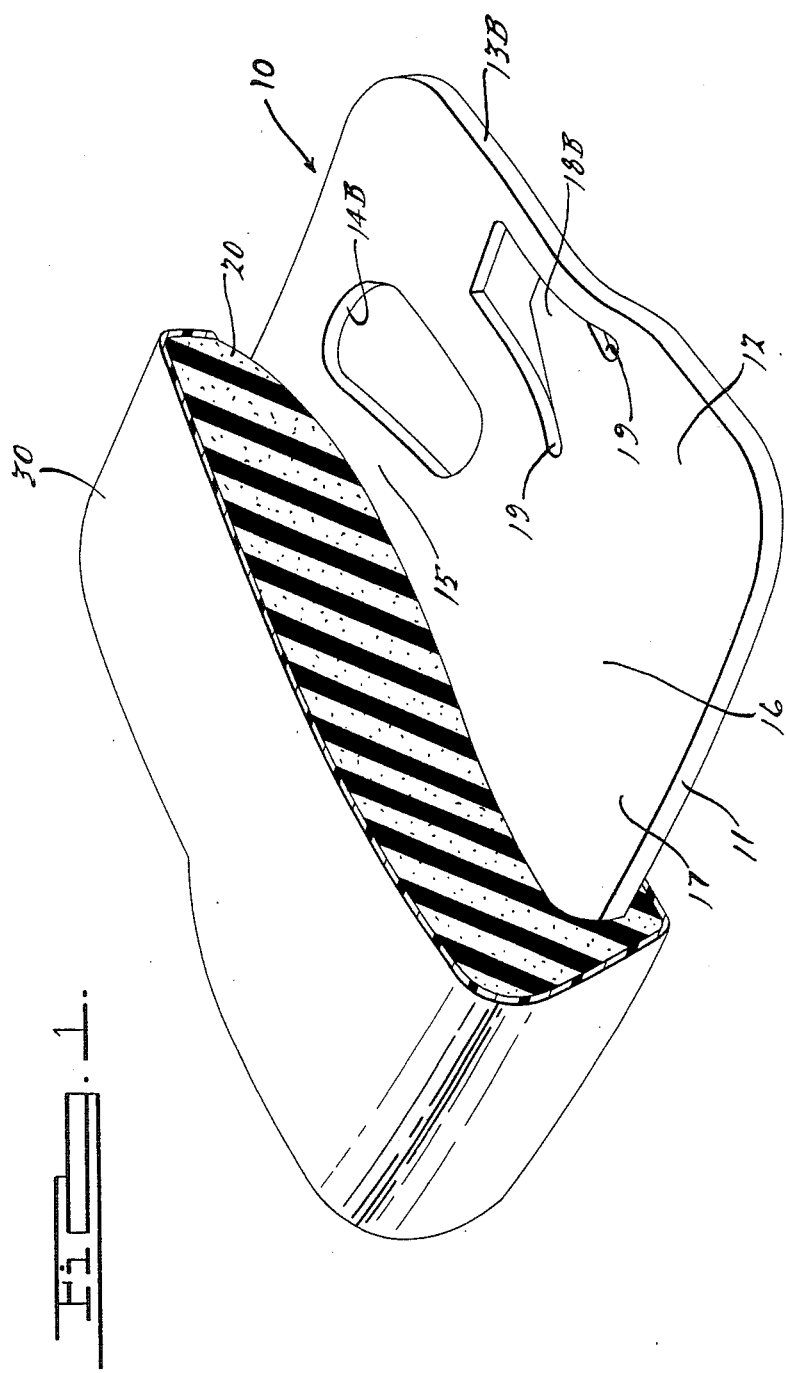
FIG. 1 is a perspective view of a molded, one-piece, form-retaining, resilient plastic seat pan according to the present invention, shown with a cushion and upholstery cover partially cut away.

Referring now to the drawings, a molded, one-piece, form-retaining, resilient plastic seat pan 10 is seen in FIG. 1 in an exemplary assembly with a foam cushion 20 and upholstery cover 30. The foam cushion and upholstery cover are cut away from the left-hand side of the seat pad for purposes of illustration. It can be seen in this embodiment that the cushion wraps around and under the forward edge 11 of the seat pan. The upholstery cover 30 encases the seat pan and cushion.

Figure 2:
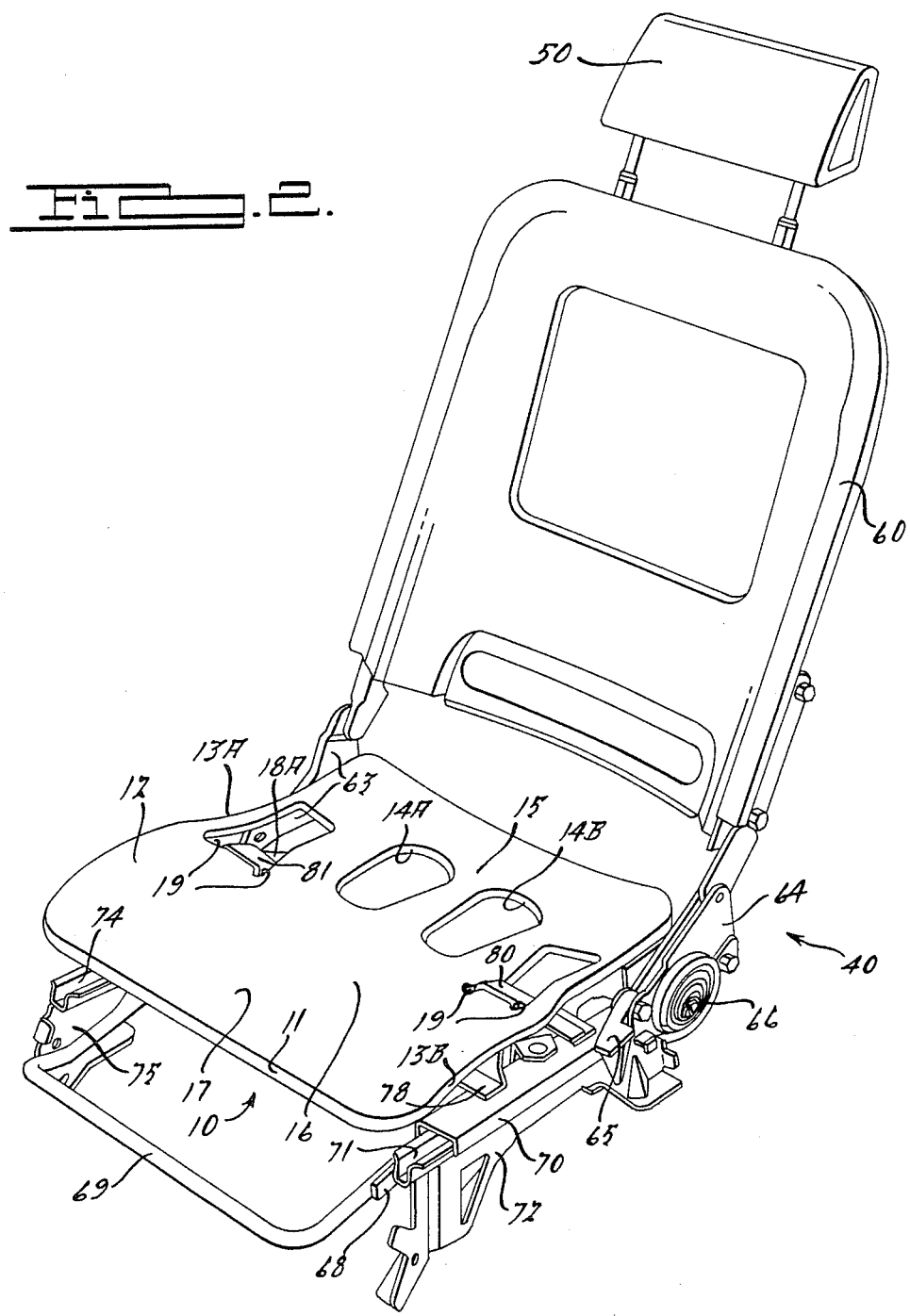
FIG. 2 is a perspective view of a motor vehicle seat assembly according to the present invention, incorporating the seat pan of FIG. 1.
Figure 3:
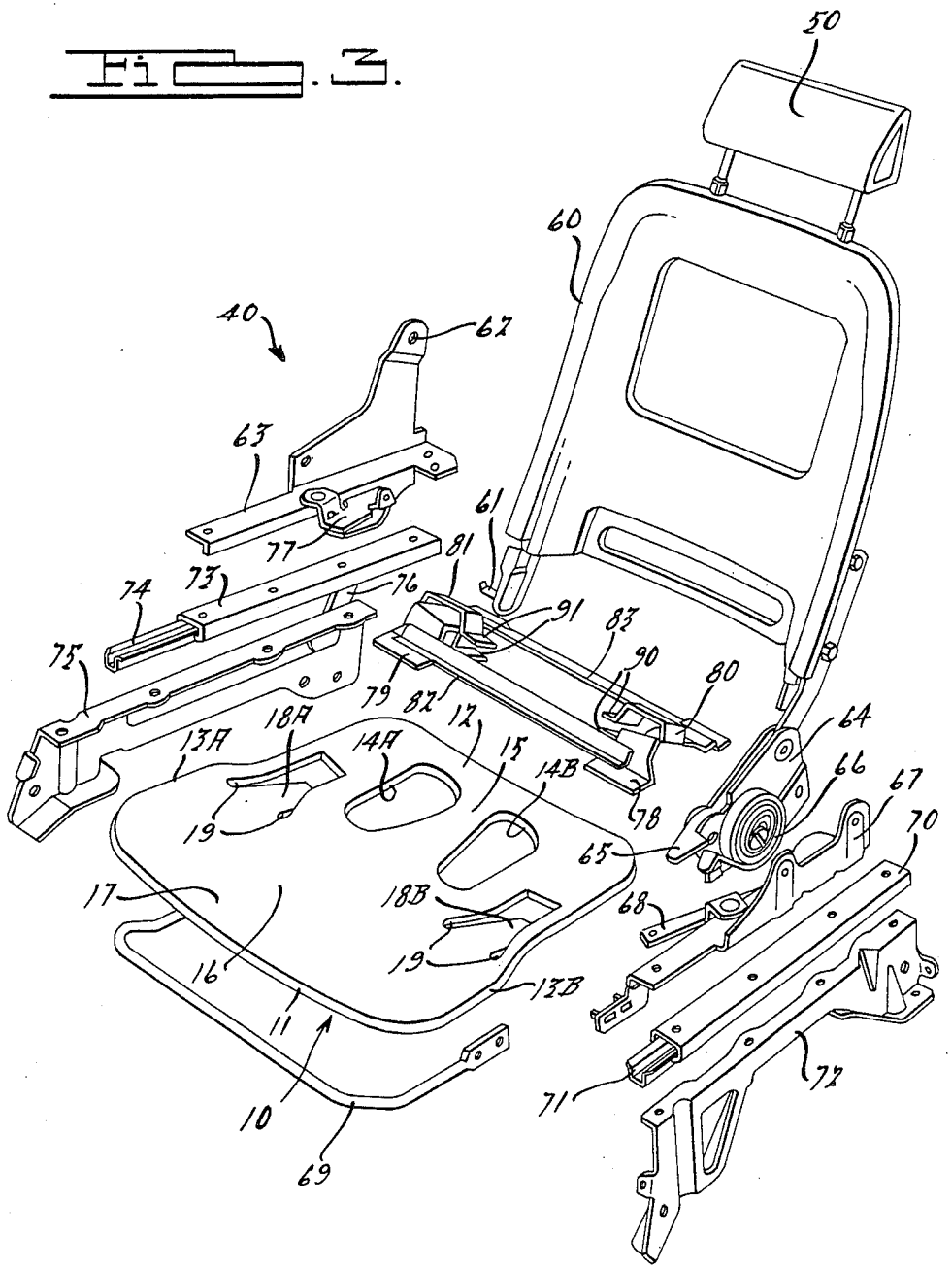
FIG. 3 is an exploded view of the seat assembly of FIG. 2.

Referring to the seat pan, as seen in FIGS. 1-3, it is seen to have a substantially curvilinear upper surface 12, substantially parallel lateral edges 13A (right-hand side) and 13B (left-hand side). The aforesaid forward edge 11 is seen to be substantially perpendicular to the lateral edges 13A, 13B. A pair of ishium accommodating apertures 14A (right-hand side) and 14B (left-hand side) are seen to be laterally spaced from each other in a rearward portion 15 of the seat pan. Alternative ishium accommodating means will be apparent to the skilled in the art in view of the present disclosure. Thus, for example, a single larger opening may be used in place of the two openings shown in the embodiment of the drawings. Alternatively, the ishium accommodating means may comprise simply a molded-in depression in the seat pan. Yet another alternative design involves cutting through the seat pan laterally, perhaps in an arc or three-sided box configuration, to define a laterally centered portion of the seat pan which is relatively easily deflected by pressure of the occupant's weight.

The rearward portion 15 of the seat pan can be seen to be concavely curved downwardly. A forward portion 16, is laterally wider than the rearward portion and in the embodiment shown is slightly bowed upwardly, such that a longitudinal cross-section vertically through the middle of the seat pan would have a somewhat S-shaped configuration. Forward portion 16 comprises a forwardmost portion 17 which curves downwardly toward the front to the forward edge 11.

The seat pan is mounted in a seating assembly by means of mounting tangs 18A (right-hand side) and 18B (left-hand side). Such mounting tangs are unitary with the seat pan. Each is located inboard of and adjacent a corresponding lateral edge. Thus, mounting tang 18A is located inboard of lateral edge 13A and mounting tang 18B is located inboard of lateral edge 13B. To enhance stability of the seat pan and provide good lateral edge support in the assembled seat, each mounting tang is located proximate the corresponding lateral edge rather than closer to the longitudinal centerline of the seat pan. The mounting tangs extend rearwardly from their connection with the main body of the seat pan, each having a substantially planar portion sloping downwardly to the rear. As discussed hereinafter, such planar portion is adapted to be received by a mounting bracket in a seat track assembly. Optionally, the mounting tang may have additional segments and thus, for example, may comprise multiple planar segments at an angle to one another, each segment extending rearwardly from the preceding segment. According to an alternative embodiment, the tangs may extend downwardly to the front, rather than to the rear. This generally will affect the spring rate of the seat and, accordingly, the suspension characteristics perceived by the seat occupant. By altering the length, thickness, attachment point etc. of the mounting tangs, this change in suspension characteristics can be minimized or even eliminated.

The mounting tangs should be longitudinally located such that a line between the point of connection of each to the main body of the seat pan is forward of the center point of the weight to be carried by the seat pan, since this will reduce the tendency of the seat pan to rock back and forth. Preferably about two-thirds of the weight is rearward of the line. Also, it will reduce stress at the interface of the mounting tang with the main body of the seat pan when seat occupant movement causes the seat pan to be rocked back and forth. Preferably, the area of interface, that is the connection of the mounting tangs to the seat pan, is located proximate the area of transition between the forward portion 16 and rearward portion 15 of the seat pan. That is, in the embodiment shown in the drawings, the connection of the mounting tangs to the main body of the seat pan would be proximate the location of lateral width transition between the forward portion 16 and the rearward portion 15. To further reduce stress at the area of interface between the mounting tang and the main body of the seat pan, it is preferable to provide approximately circular, stress distributing apertures on both sides of each mounting tang at its connection to the main body of the seat pan. Thus, as seen in the embodiment shown in the drawings, circular apertures 19 are provided at the connection of the mounting tangs to the seat pan.

It will be recognized by the skilled of the art in view of the present disclosure that the seat pan need not be wider in the front section than in the rearward section. This design will generally be preferred where a seat assembly comprises hardware which will not allow a seat pan width at the rearward end which is as wide as that desired for the forward end.

The one-piece, form-retaining, resilient seat pan of the invention preferably comprises plastic, most preferably a fiber reinforced plastic (FRP) in view of the good strength and durability of such materials. Materials such as Azdel (trademark) and SMC-type materials are well suited for use in the present invention. Additional materials are commercially available and would be readily apparent to the skilled of the art in view of the present disclosure. The seat pan can be made by a thermoforming or thermostamping process or by other methods, depending upon the particular material used, according to methods and techniques which also are well known to the skilled of the art. If desired, reinforcing materials and attachment means and the like can be incorporated into the seat pan according to techniques well known to the skilled of the art. It may be desirable, for example, to include fastening means on the underside of the seat pan for securing the cushion 20 and/or the upholstery cover 30.

The particular dimensions of the seat pan, such as width, thickness, etc., will depend largely upon the strength and durability of the chosen material, the weight loads to be carried, and thermal cycling stresses and other environmental and use factors. According to preferred embodiments, the thickness of the seat pan will be greater in the mounting tang and the area of connection between the mounting tang and main body of the seat pan, since these areas will be subject to concentrated weight loads and movement. A typical thickness for a seat pan according to the present invention formed of Azdel (trademark) for a motor vehicle seat would be approximately ¼ to ⅜ inch thick in the main body of the seat pan, such as in the area between the ishium accommodating apertures. The mounting tangs generally would be considerably thicker, for example about ¾ inch thick. Notwithstanding the difference in thickness, the seat pan can be formed of a single sheet of uniform thickness, since material of the sheet can be caused to flow somewhat during the forming process to create relatively thicker and thinner areas.

Referring now particularly to FIGS. 2 and 3, an upholstered seat cushion assembly is seen comprising the above-described seat pan. This exemplary seat assembly would be suitable for use in an upholstered seat for a motor vehicle, particularly in a driver's seat in a left-hand drive vehicle. As will be understood from the following discussion, according to this preferred embodiment weight loads carried by the seat back are transmitted directly to the vehicle body (or other foundation) through appropriate bracketry and mounting means, not through the seat pan. The seat assembly comprises head rest 50, seat back frame 60, seat pan 10 and associated fixtures and bracketry which will be described now in detail. It should be understood that the seat assembly typically would be employed with cushioning and upholstery such as that depicted in FIG. 1. The seat back frame in the exemplary embodiment depicted in the drawings is pivotably mounted. It comprises a pivot pin 61 extending laterally outwardly at its lower right-hand side. Pivot pin 61 is received by pivot pin hole 62 of a seat back pivot mounting bracket 63. At its lower left side the seat back frame is connected to a recliner mechanism 64 which can be any of various designs known to the skilled in the art. As shown, recliner mechanism 64 has a lever 65 operable by the seat occupant. Biasing spring 66 biases the seat back frame to a forward position. Recliner mechanism 64 attaches to recliner mechanism mounting bracket 67 which includes a seat track release mechanism 68 operable by means of seat track release bar 69. Mounting bracket 67 is mounted to seat track slide 70 which rides on left-hand seat track 71. The left-hand seat track 71 is mounted to seat support 72, which is referred to also as a riser. Correspondingly, on the right-hand side of the seat assembly, seat back pivot mounting bracket 63 is mounted to right-hand seat track slide 73 which rides on right-hand seat track 74 which, in turn, is mounted to right-hand seat support 75. Seat back pivot mounting bracket 63 further comprises a seat track release mechanism 77 corresponding to the seat track release mechanism 68 on the left side of the seat assembly. The seat assembly is seen to comprise also seat belt attachment means 76, the particular features of which can be according to any of various designs known to the skilled of the art.

Seat pan 10 is mounted to the seat assembly by means of left-hand seat pan mounting bracket 78 and right-hand seat pan mounting bracket 79 comprising clamping portions 80 and 81, respectively. Each of these clamping portions is clamped about a corresponding mounting tang of the seat pan. The laterally inwardly extending flanges 90, 91 of the clamping portions 80, 81, respectively, are clamped together with sufficient force to securely hold the mounting tangs. This can be done by means of sheet metal screws or other fasteners through the aforesaid flanges of the clamping portions or by any of various other means which will be apparent to the skilled of the art in view of the present disclosure. The two seat pan mounting brackets 78 and 79 are connected together by means of brace 82 in the front and brace 83 in the back to lend strength and structural rigidity to the assembly. The seat pan mounting bracket 78 on the left-hand side is attached to recliner mechanism mounting bracket 67. The seat pan mounting bracket 79 on the right-hand side is attached to the seat back pivot mounting bracket 63.

According to an alternative embodiment of the invention, the connection between the mounting tangs of the seat pan and the seat pan mounting brackets can provide means for varying the location of the tang at which it is secured to the bracket. Adjusting the attachment position along the tang would correspondingly vary the suspension characteristics of the seat pan. The means for varying the point of attachment can be either mechanical or electro-mechanical and preferably would be operable by the seat occupant. Thus, for example, clamping near the top of the mounting tang, that is, close to the main body of the seat pan, would provide a stiffer suspension. If on the other hand the mounting brackets are attached near the distal end of the mounting tang, then a more flexible or softer suspension would be provided allowing more rocking motion.

While a preferred embodiment of the present invention has been described above, it should be understood that the invention is not limited by the particular materials or methods of fabrication specifically disclosed. Any relatively thin material which is sufficiently strong and resilient and which can be formed into a relatively rigid body will be suitable for the seat pan of the invention. Similarly, any fabrication method can be used which is compatible with achieving the desired resiliency and structural configuration for the material selected. Also, it will be understood by those skilled in the art, in view of the present disclosure, that the various bracketry components can be mounted and attached to one another by rivets, bolts, screws and other known means, it being within the skill of the art to select the most appropriate means in each case.

While the invention has been described in conjunction with specific embodiments, it will be understood by the skilled of the art in view of the present disclosure that various alternatives, modifications and variations are within the spirit and scope of the appended claims.

We claim:

1. A seat cushion support for an upholstered seat, comprising:
  a one-piece, form-retaining, resilient seat pan having a substantially curvilinear upper surface, substantially parallel lateral edges, a forward edge substantially perpendicular to said lateral edges, ishium accommodating means in a rearward portion of said seat pan, said rearward portion being concavely curved downwardly, and a forward portion which comprises a forwardmost portion curving downwardly to said forward edge; and
  a pair of mounting tangs, each unitary with said seat pan and located proximate and inboard of a corresponding one of said lateral edges, each extending downwardly from connection with said seat pan.

2. The seat cushion support of claim 1, wherein said forward portion is laterally wider than said rearward portion.

3. The seat cushion support of claim 2, wherein said connection of each said mounting tang to said seat pan is located proximate an area of lateral width transition between said forward portion and said rearward portion.

4. The seat cushion support of claim 1, wherein approximately circular, stress distributing apertures are provided on both sides of each said mounting tang at said connection thereof with said seat pan.

5. A seat cushion support for an upholstered seat, comprising:
  a one-piece, form-retaining, resilient seat pan having a substantially curvilinear upper surface, substantially parallel lateral edges, a forward edge substantially perpendicular to said lateral edges, ishium accommodating means in a rearward portion of said seat pan, said rearward portion being concavely curved downwardly, and a forward portion which comprises a forwardmost portion curving downwardly to said forward edge; and a pair of elongate, flexible mounting tangs, each unitary with said seat pan and located proximate and inboard of a corresponding one of said lateral edges, each extending downwardly to the rear from connection with said seat pan.

6. The seat cushion support of claim 1, wherein said ishium accommodating means comprises a pair of ishium accommodating apertures laterally spaced from each other.

7. The seat cushion support of claim 1, wherein said seat pan comprises fiber reinforced plastic.

8. A seat assembly comprising:
(A) a seat cushion support comprising:
a one-piece, form-retaining, resilient seat pan having a substantially curvilinear upper surface, substantially parallel lateral edges, a forward edge substantially perpendicular to said lateral edges, a pair of ishium accommodating apertures laterally spaced from each other in a rearward portion of said seat pan, said rearward portion being concavely curved downwardly, and a forward portion which is laterally wider than said rearward portion and which comprises a forwardmost portion curving downwardly to said forward edge; and
a pair of mounting tangs, each unitary with said seat pan and located proximate and inboard of a corresponding one of said lateral edges, each extending rearwardly from connection with said seat pan and each having a substantially planar portion sloping downwardly to the rear;
(B) a resilient cushion member overlaying said seat pan;
(C) an upholstery cover encasing said cushion member and seat pan; and
(D) a pair of mounting brackets, each attached to a corresponding one of said mounting tangs for resiliently supporting said seat pan.

9. The upholstered seat cushion assembly of claim 8, wherein said forward portion is laterally wider than said rearward portion.

10. The upholstered seat cushion assembly of claim 5, wherein said connection of each said mounting tang to said seat pan is located proximate an area of lateral width transition between said forward portion and said rearward portion.

11. The upholstered seat cushion assembly of claim 8, wherein approximately circular, stress distributing apertures are provided on both sides of each said mounting tang at said connection thereof with said seat pan.

12. The upholstered seat cushion assembly of claim 8, wherein said mounting tangs extend downwardly to the rear.

13. The upholstered seat cushion assembly of claim 8, wherein said ishium accommodating means comprises a pair of ishium accommodating apertures laterally spaced from each other.

14. The upholstered seat cushion assembly of claim 8, wherein said seat pan comprises fiber reinforced plastic.

15. The upholstered seat cushion assembly of claim 8, further comprising means to selectively adjust the location of attachment of said mounting tangs to said mounting brackets.

* * * * *